United States Patent
Weston

(10) Patent No.: US 11,348,298 B2
(45) Date of Patent: May 31, 2022

(54) CONNECTED AVATAR TECHNOLOGY

(71) Applicant: INFINITE KINGDOMS LLC, Wakefield, RI (US)

(72) Inventor: Denise Chapman Weston, Wakefield, RI (US)

(73) Assignee: Infinite Kingdoms LLC, Wakefield, RI (US)

(*) Notice: Subject to any disclaimer, the term of this patent is extended or adjusted under 35 U.S.C. 154(b) by 0 days.

(21) Appl. No.: 16/361,972

(22) Filed: Mar. 22, 2019

(65) Prior Publication Data

US 2019/0295306 A1 Sep. 26, 2019

Related U.S. Application Data

(60) Provisional application No. 62/646,446, filed on Mar. 22, 2018.

(51) Int. Cl.
*G06T 13/40* (2011.01)
*A63F 13/56* (2014.01)
*G06N 20/00* (2019.01)
*A63F 13/79* (2014.01)
*G06V 40/16* (2022.01)

(52) U.S. Cl.
CPC ............ *G06T 13/40* (2013.01); *A63F 13/56* (2014.09); *A63F 13/79* (2014.09); *G06N 20/00* (2019.01); *G06V 40/172* (2022.01)

(58) Field of Classification Search
CPC .......... G06T 13/40; A63F 13/56; A63F 13/79; G06N 20/00; G06K 9/00288
USPC ........................................................ 345/473
See application file for complete search history.

(56) References Cited

U.S. PATENT DOCUMENTS

| | | |
|---|---|---|
| 9,789,403 B1* | 10/2017 | Furment ............... A63F 13/428 |
| 2004/0266505 A1 | 12/2004 | Keam et al. |
| 2007/0211047 A1 | 9/2007 | Doan et al. |
| 2007/0268312 A1 | 11/2007 | Marks et al. |

(Continued)

OTHER PUBLICATIONS

Notification of Transmittal of the International Search Report and the Written Opinion of the International Searching Authority (Forms PCT/ISA/220, PCT/ISA/210 and PCT/ISA/237) dated Jun. 7, 2019, by the ISA/US Commissioner for Patents in corresponding International Application No. PCT/US 19/23602. (13 pages).

*Primary Examiner* — Jin Ge

(57) ABSTRACT

The connected avatar is a virtual participant or assistant in an interactive game or entertainment attraction that recognizes players or items carried by players, and visually and/or audibly engages with the player throughout the interactive game or entertainment attraction to provide assistance, aid, guidance, or direction to them through the environment, provide items, information or clues, and/or pose challenges or games. The player may summon or enlist the connected avatar to perform tasks or retrieve information or items. In one embodiment, the connected avatar lives in a virtual parallel world that is connected to the real world through portals (such as mirrors, windows, or holographic displays) that can be accessed throughout the interactive game or entertainment attraction. The connected avatar combines the two worlds in an interactive manner and contributes to the connectivity of the player to the interactive game or entertainment attraction.

19 Claims, 7 Drawing Sheets

(56) References Cited

U.S. PATENT DOCUMENTS

| | | | |
|---|---|---|---|
| 2009/0149246 A1* | 6/2009 | Opaluch | A63F 13/63 463/29 |
| 2009/0309891 A1* | 12/2009 | Karkanias | G06F 19/3418 345/581 |
| 2011/0007079 A1* | 1/2011 | Perez | H04N 21/4532 345/473 |
| 2011/0107239 A1 | 5/2011 | Adoni et al. | |
| 2013/0083173 A1* | 4/2013 | Geisner | G06F 3/013 348/51 |
| 2014/0125698 A1* | 5/2014 | Latta | G06F 3/011 345/633 |
| 2014/0181820 A1 | 6/2014 | Vignocchi et al. | |
| 2016/0163084 A1* | 6/2016 | Corazza | G06T 13/40 345/419 |
| 2017/0106283 A1* | 4/2017 | Malyuk | A63F 13/352 |
| 2018/0093185 A1* | 4/2018 | Black | A63F 13/537 |
| 2018/0361258 A1* | 12/2018 | Malyuk | A63F 13/79 |
| 2019/0160378 A1* | 5/2019 | Fajt | A63F 13/53 |
| 2020/0384367 A1* | 12/2020 | Lake-Schaal | G06N 5/04 |

* cited by examiner

CONNECTED AVATAR TECHNOLOGY

CROSS-REFERENCE TO RELATED APPLICATION

This Application claims the benefit of U.S. Provisional Application No. 62/646,446, filed on Mar. 22, 2018, the disclosure of which is incorporated herein in its entirety.

FIELD

This disclosure generally relates to connected avatar technology to be used in combination with gaming or smart entertainment attractions, including smart rooms and smart components.

BACKGROUND

Amusement parks, museums, shopping centers, and other attraction, retail, or entertainment-based properties often host entertainment attractions, where individuals can engage in interactive play and gaming experiences. Such interactive gaming experiences typically involve the player directly interacting with the characters and components on a screen or in the environment immediately surrounding them. For example, a player in an entertainment attraction may direct the activity of an on-screen character only or interact with other live players simultaneously playing the game within a shared environment.

The presently-available gaming and entertainment attraction experiences require constant direct control of the game play by the player, and do not allow the player to look or step away from the play environment. Similarly, they do not allow for the player to enlist the assistance of a virtual player to help solve problems, complete challenges, find items, or aid the player in their tasks.

SUMMARY OF DISCLOSURE

The present invention relates to a virtual participant in a game or entertainment attraction that lives in a virtual parallel universe. This "connected avatar" can be engaged by a player through a portal (such as a mirror, window, wall, or holographic display, AR/VR/MR XR headsets, glasses, etc. within the entertainment attraction to participate with and assist the player and enhance the player's game-play experience. For example, the player may request that the connected avatar find and collect certain items within its parallel universe that may be necessary to complete a task in the player's universe. As another example, the player may direct the connected avatar to assist in slaying or taming a dragon (or some other foe). As another example, the player may seek guidance from the connected avatar for the performance of magical spells.

This connected avatar provides for deeper connection between the player and the content of the game and allows for new layers of engagement for the player, including physical presence and social interaction between people. The connected avatar also allows for reduction in "screen time" by allowing the player to provide instructions to the connected avatar to perform certain tasks, then "step away" from the game and return upon completion of the task by the connected avatar.

Because the connected avatar lives in a parallel universe, separate from the player's reality, the present invention allows for a combination of multiple worlds into a single game. The virtual avatar cannot enter the player's world, and the player cannot enter the virtual avatar's world. Nevertheless, the player and the virtual avatar may combine efforts to accomplish tasks and enhance gameplay in each other's world. Similarly, because the player and the connected avatar exist in parallel universes, the present invention allows for separate storylines to occur simultaneously and intermingle. As explained below, however, the player's real world, and the connected avatar's virtual world may intermingle, and activities in one world may have effects in the other world, or result in actions in the other world.

A connected avatar can take many forms, including but not limited to a replication of the player, selected human or humanoid characters, mammals, dragons, birds, insects, dinosaurs, monsters, fantasy creatures, objects, environment, to name just a few. Avatars can be further modified or upgraded by earning or purchasing special add-on features (such as ability to fly, see in the dark, or cast magical spells), clothing (such as armor, helmets, robes, belts, boots, backpacks, costumes, or hats), or accessories (such as jewels, rings, staffs, weapons, wands, books, tools, shields, or wings). Such special add-ons, features, clothing, or accessories may add features, functions, or abilities to the character.

Importantly, to enhance the game play experience, the connected avatar can be given a personality. It can mimic the personality traits of the user, or be assigned certain characteristics. The user or the system can assign different levels of fear, bravery, and other attributes. If desired, the player can adjust or optimize the features of the avatar. For example, the user can adjust personality characteristics, including fear, bravery, wisdom, humor, optimism, teamwork, honesty, humility, prudence, sympathy, and intelligence. The user may adjust the physical characteristics of the avatar, including size, shape, and color of various features, including head, face, hair, shoulders, chest, arms, wrists, hands, waist, legs, and feet. The user may adjust the physical attributes of the avatar, including strength, agility, balance, flexibility, speed, coordination, and endurance. In addition, the player may adjust language abilities and magical abilities, skill, and power of the avatar.

To perform the function of connecting with the player in the entertainment attraction, the connected avatar may incorporate technologies such as smart systems, tracking, mapping, projection, artificial intelligence, digital twin, special effects, real time content, image capture, computer vision, software data integration, and gaming platform diversity, as well as any other technologies known to those of skill in the art. By using such presently existing artificial intelligence and mechanical learning technologies, the connected avatar can learn from interaction with the player and participation in the game, and the responses can evolve as appropriate in the game. By use of such learning, the connected avatar can avoid providing pre-programmed or canned responses and make the interactivity more natural and realistic.

Game play can involve various different methods of play, including controllers, wands, blasters, brushes, instruments. These items may be virtual or real. For example, certain controllers, wands, blasters, brushes, or instruments may be available and may have embedded sensors or technology that allow for interaction with the game environment, and may be tracked into a virtual item. The player's items would be recognized and useful both in the player's world and in the connected avatar's virtual world. The game system will automatically identify such devices and energize them with their abilities (i.e., a wand to cast spells, a gun to shoot lasers, or a brush to paint, for example).

As explained above, actions in the real world may have effects or consequences in the virtual world, and vice versa. For example, a player could touch the portal (e.g., a screen) with an object (such as a ball), and a fireball would appear in the virtual world, and become available for the connected avatar to perform a task. Similarly, the connected avatar could touch the portal with an object (such as a golden sword), and that object would then be available for use or purchase in the real world.

Other players and/or virtual avatars may enter the game and participate in the quests. Multiple players and avatars can play at the same time or be on the same quests and missions and assist each other with their completion or exploration of the real and virtual world.

The player can interact with the connected avatar at various points in time throughout the gaming experience and at various physical locations throughout the entertainment attraction, for example, the connected avatar may be summoned by the player and appear at a portal upon command. Alternatively, the connected avatar may appear when the entertainment attraction system recognizes that the player requires some assistance or is off track. Alternatively, the connected avatar may appear at a predetermined location or point in time (for example, the player may instruct the connected avatar to meet them at a particular cave at a certain time or after accomplishing a certain task). The player may carry or wear certain devices that may be used to indicate that the connected avatar has completed a task or wishes to communicate with the player. Such alerts may also be provided over a mobile application.

To aid in the immersive nature of the experience, the player may also wear glasses or other visual screen that enhances the vision of the effects or onscreen abilities. For example, the gameplay may involve augmented reality, QR codes, or 3-dimensional effects, which require certain glasses to make such effects visible to the player.

DESCRIPTION OF EXAMPLE EMBODIMENTS

Connected Avatar

The teachings of the present disclosure describe a connected avatar that enhances game play within an entertainment attraction (such as the MagiQuest interactive game found at Great Wolf Lodge theme parks). The connected avatar provides for an enhanced entertainment experience by providing a virtual assistant or counterpart to assist a player in performing tasks or guiding a player through certain challenges within the entertainment attraction.

Figure 1:
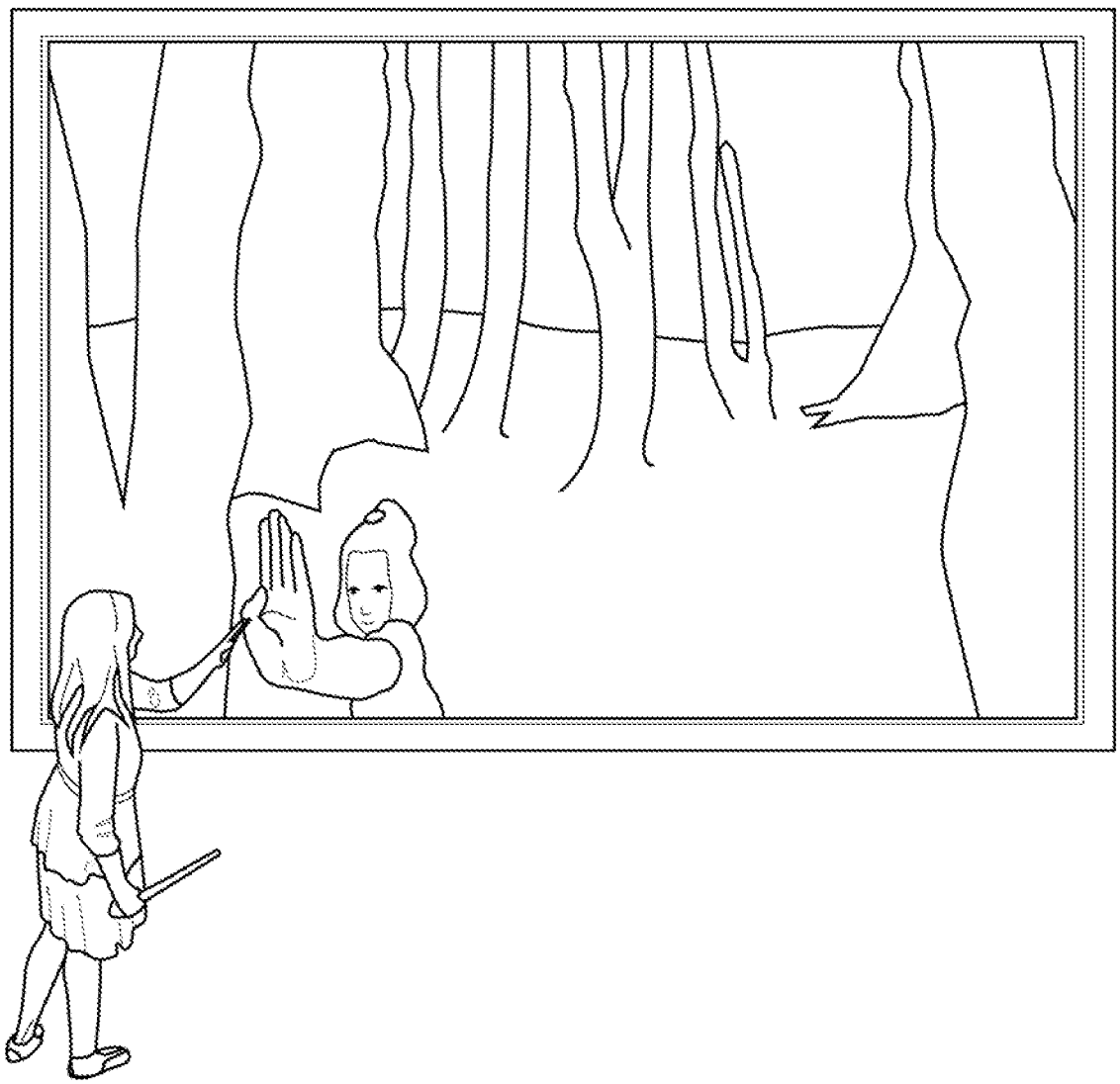
FIG. 1 illustrates an example portal for a connected virtual avatar in accordance with a non-limiting embodiment of the present disclosure.

In certain embodiments, the connected avatar may appear through a portal or other display mechanism, as depicted in FIG. 1, such as a mirror, a window, a wall, a screen or monitor, or as a holographic image or other light display or the like.

Figure 2:
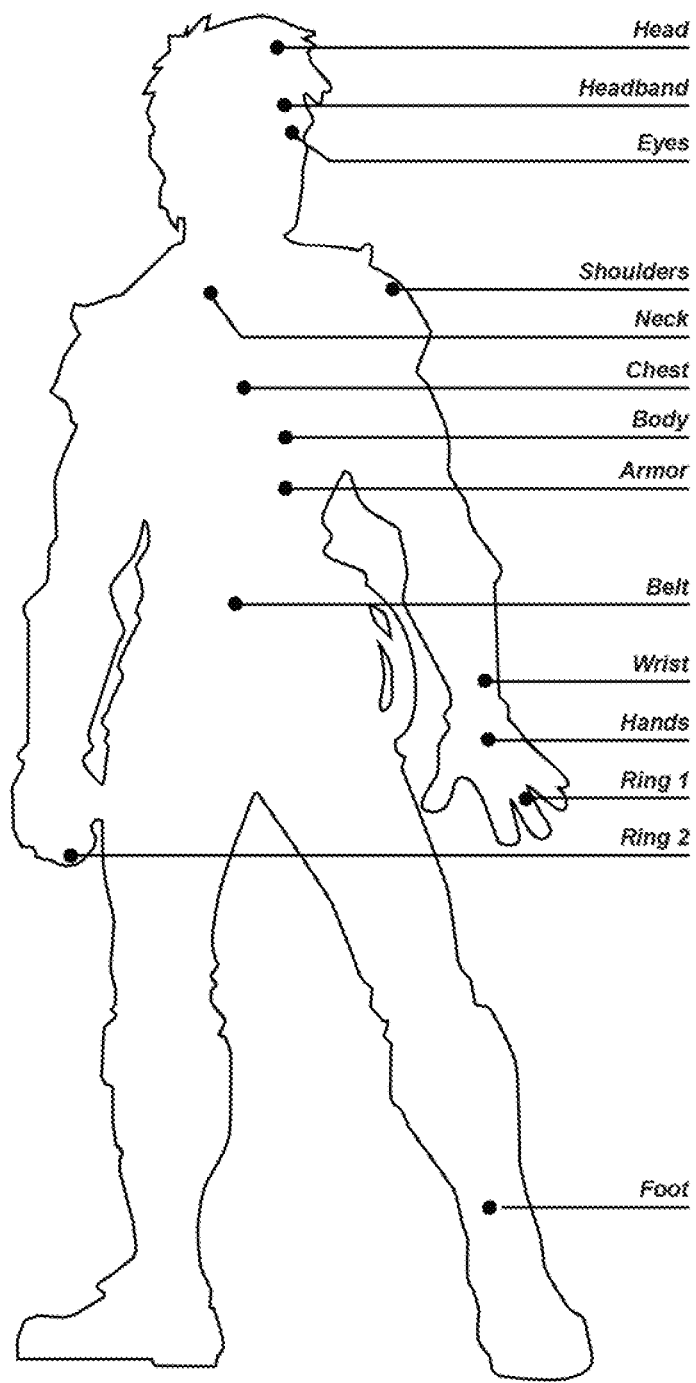
FIG. 2 illustrates an example customizable connected virtual avatar in accordance with a non-limiting embodiment of the present disclosure.
Figure 3:
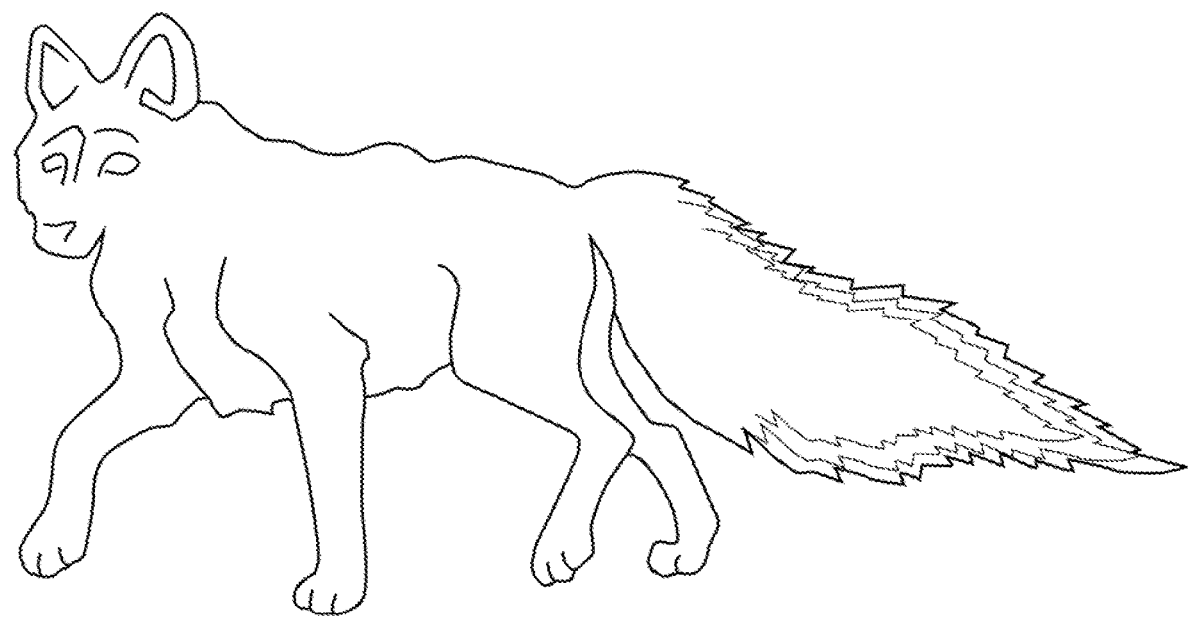
FIG. 3 illustrates an example customizable connected virtual avatar in the form of a mammal (wolf) in accordance with a non-limiting embodiment of the present disclosure.
Figure 4A:
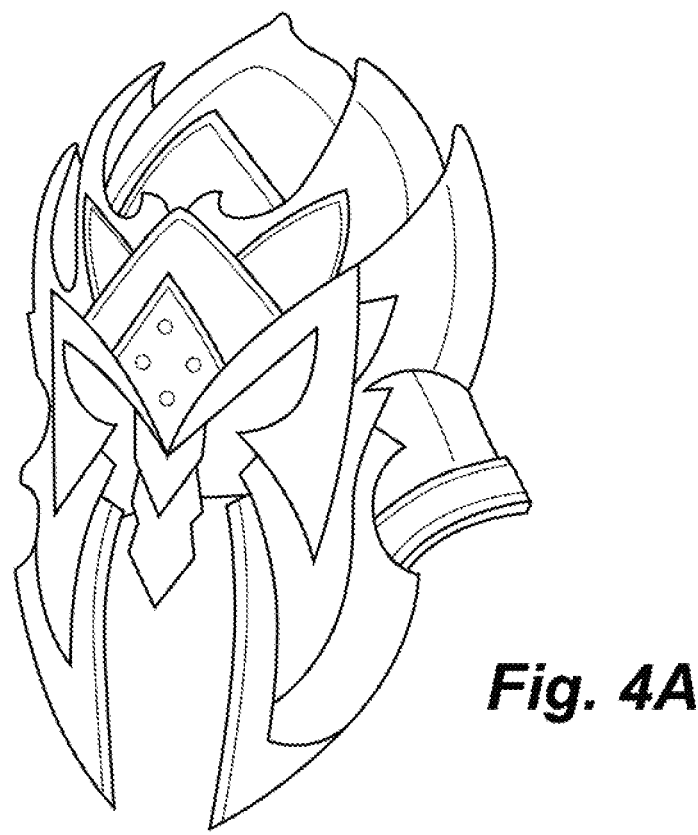
FIG. 4 (A-D) illustrates examples of special items that can be purchased or achieved as a reward to enhance game play and player's abilities and characteristics, in accordance with a non-limiting embodiment of the present disclosure.
Figure 4B:
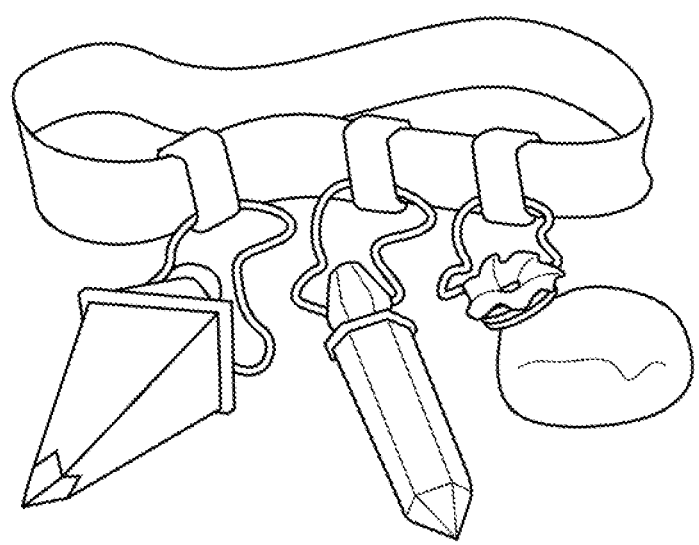
Figure 4C:
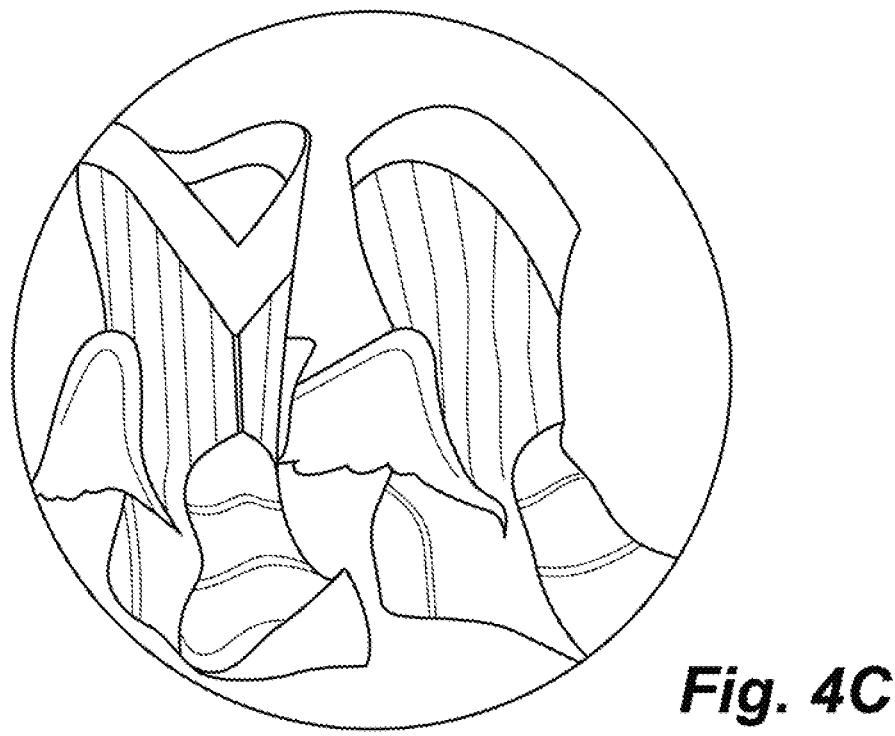
Figure 4D:
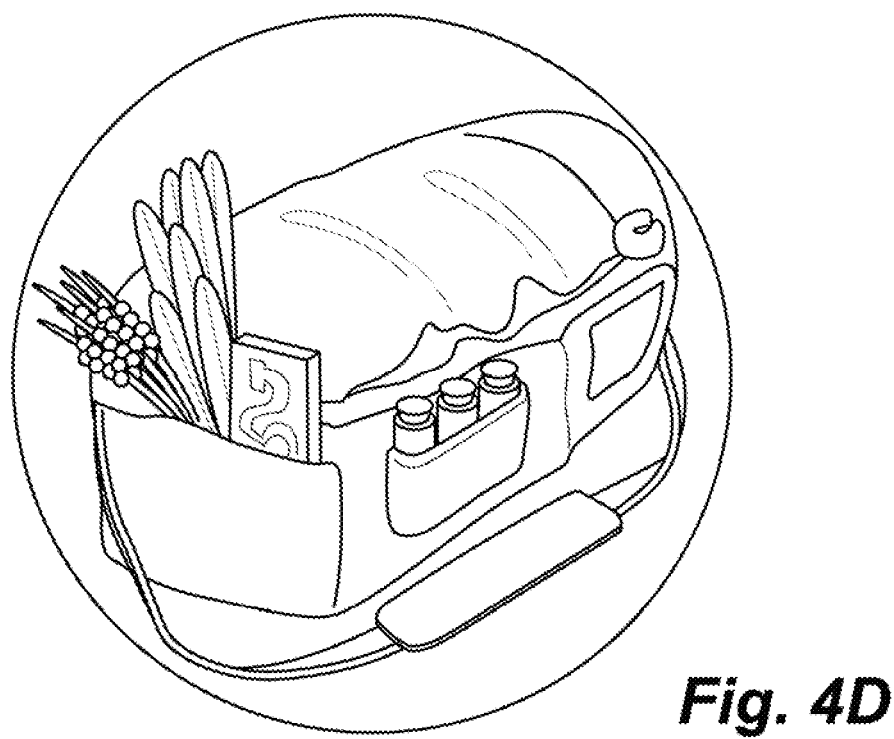

In certain embodiments, the connected avatar may appear as a mirror image of the player themselves, or as an altered version of themselves. In another embodiment, as depicted in FIG. 2, the connected avatar may appear as a mammal, such as a wolf, or a bird, such as an eagle. In yet another embodiment, the connected avatar may appear as a mythological beast or some other fantasy character.

The connected avatar may be presented in either 2-dimensional or 3-dimensional renderings on a conventional screen or monitor, projected onto a wall or glass pane, or may be depicted by other holographic techniques or the like.

The player may purchase or earn certain add-on items to enhance characteristics or abilities of the player or the avatar in the game environment. As depicted in FIGS. 4A, 4B, 4C, and 4D, embodiments of these add-on items include clothing (such as armor, helmets (FIG. 4A), robes, belts (FIG. 4B), boots (FIG. 4C), backpacks, costumes, or hats), or accessories (such as satchels (FIG. 4D), jewels, rings, staffs, weapons, wands, books, tools, shields, or wings). Such special add-ons, features, clothing, or accessories may add features, functions, or abilities to the character. For example, in one embodiment, a player may purchase a helmet (FIG. 4A), which increases the ability of the player or the connected avatar to sustain battle with a dragon in the game. In another embodiment, for example, a player may purchase boots (FIG. 4C), which allows the player or the connected avatar to run faster and accomplish tasks at greater speeds. In yet another embodiment, a player may purchase or earn a satchel containing multiple items (FIG. 4D), which may provide for multiple enhancements, such as increased magical abilities or replenished health. When a player utilizes an add-on item, the system may recognize that item via a sensor, and the connected avatar may be modified to exhibit that same item or other corresponding change in appearance or activity. For example, if the player wears a add-on costume, the system may recognize this item, and the connected avatar may appear wearing the same costume. Similarly, for example, if the player possesses an add-on jewel, the connected avatar may respond by changing color or increasing in size, The connected avatar utilizes technology such as artificial intelligence or mechanical learning to track player interaction, responds to player input and feedback, and records player actions to customize experiences for players, thus creating dynamic, immersive, theatrical, advanced, interactive, and personalized attractions. The experiences provided by these connected avatars may be changed with minimal effort, and primarily with software or graphics updates without requiring significant infrastructure investment or the like. Moreover, the connected avatars can be preloaded with different configurations or scenarios and may customize the experience for a player. In other words, the content and interactive programming of the connected avatar may be changed between visitors by detecting each player at any given time to provide totally different experiences that are customized for each user.

Figure 5:
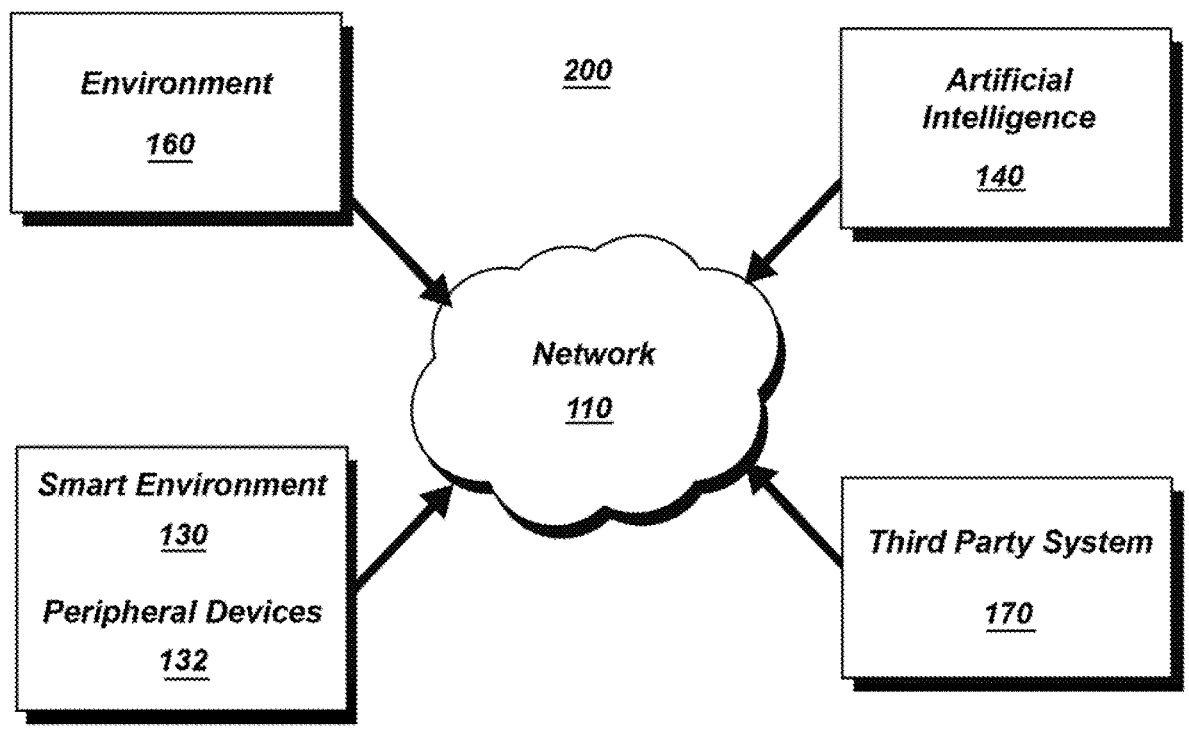
FIG. 5 illustrates an example block diagram of a connected virtual avatar in accordance with a non-limiting embodiment of the present disclosure.

For example, with reference to FIG. 5, a block diagram depicting a system 100 for interactive smart environment-based attractions are illustrated in accordance with a non-limiting embodiment of the present disclosure. System 100 includes smart environment (or room) controller 160 which may be executed on or with access to server 162 and data store 164. Smart environment controller 160 is connected to smart environment 130 and third-party system 170 via network 110 and network links 150. Smart environment 130 includes a non-limiting example of various peripheral devices, interfaces, sensors, and other interconnected smart environment devices 132 installed in the smart environment. In certain embodiments, smart environment controller 160 receives input from and controls environment variables at the smart environment, and artificial intelligence processor 140 provides for receiving input form the player, processing a response, and projecting a response back into the smart environment.

Smart Environment Recognition

Figure 6:
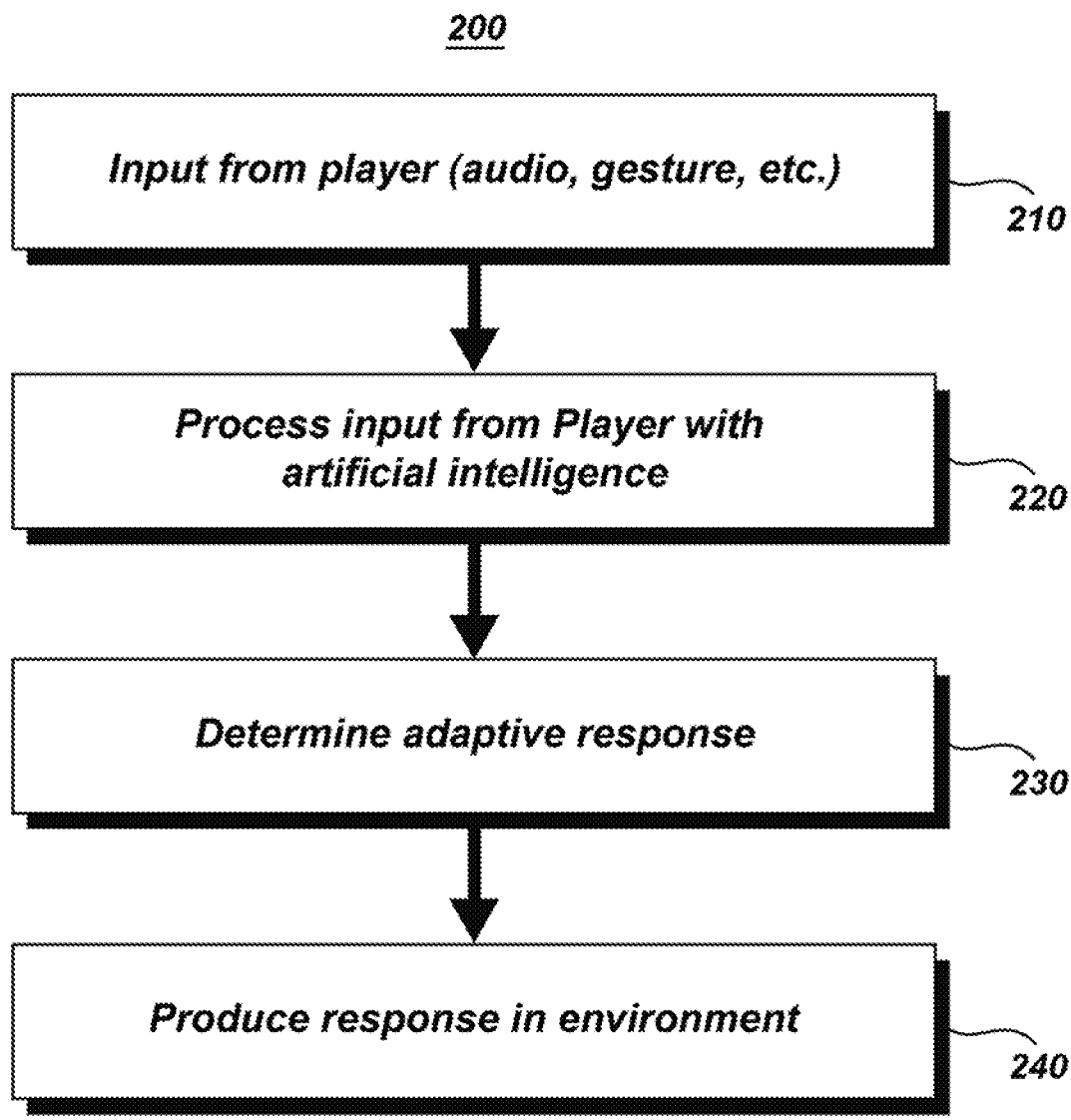
FIG. 6 illustrates an example flow chart for recognizing, reacting to, and providing adaptive and interactive displays for a connected virtual avatar in accordance with a non-limiting embodiment of the present disclosure.

In certain embodiments, one or more computer processors are configured at a central server or computer to execute computer readable instructions for a connected avatar controller to operate the connected avatar. For example, with reference to FIG. 6, a flowchart 200 for recognizing, reacting to, and providing adaptive interplay between connected avatar and the player with a non-limiting embodiment of the present disclosure. At step 210, information about the task is determined. For example, the player instructs the connected avatar (by voice activated control, gesture, or by pressing a representative button) to collect a golden sword from the avatar's parallel universe. The user input may be received, for example, by one or more of an audio receiver, scanning device, such as a camera, an RFID or other contactless scanner, a facial recognition or biometric recognition scanning device, or manual user input. At step 220 the processing software and artificial intelligence then processes the user input, determines the appropriate response at step 230, and at step 240 returns the feedback in the form of a presentation of the golden sword.

In certain embodiments, information is determined about each participant or user of the connected avatar. For example, a camera may capture images of a user's face, or other attributes of the user and attempt to determine information about the user. For example, the information may include age, enthusiasm, a level of fright or fear, a level of engagement or enjoyment, socioeconomic factors, temperature factors, or other information discernable upon inspection and analysis of a user and his or her attributes. As another example, the scanning and user information detection capabilities may be connected to outside processes or databases that further determine information regarding the user and return that information to the smart room controller for additional processing.

In certain embodiments, the connected avatar may be designed to utilize various technologies that track and determine information about the identity of a user and respond to the user, or multiple users in a group, based on image, voice, mobile device, mapping, geo-location, and emerging technologies, or more complex technologies that analyze previous activity of a user. For example, information regarding a user's previous actions can be analyzed, including things that the user has chosen, picked, created, bought, acquired, seen, and/or accomplished before they entered the smart environment. Certain pieces of this information can be readily determined, for example, with reference to internal or external databases, such as social networking systems, public databases, employer databases, or the like. In certain embodiments, guests may choose to wear a device into the room that will contain guest information.

In certain embodiments, the connected avatar may be used outside an interactive game or entertainment system. For example, a connected avatar system may be utilized as a companion to aid, entertain, talk with, educate, quiz, advise, or otherwise interact with persons in a hospital, nursing home, or educational institution, and may be displayed via a smartphone, television, home-use portal, or other display device. If desired the connected avatar may be connected via a network, and be used throughout various different locations, and the connected avatars characteristics may remain consistent.

Considerations Using Emerging and Future Technologies:

In certain embodiments, emerging technology includes one or more of the following:
Artificial intelligence
Digital Twin Technology (virtual mimics real)
Real time animation
Intelligent maintenance
Conversational systems
(Collaborative) Intelligent things
The Virtual real assistant robotic or holographic assistant
Sensory haptic feedback
Fan-build technology
Emotionally and persistently smarter expressive
Machine learning, artificial intelligence and Real Time feedback/responses:

In certain embodiments, the connected avatar will have a "real" conversation with the player/user by using machine learning/A.I and real time tracking to give responses that are/feel like a true evolving conversation and action/reaction to real time input from the user.

Conversational system between social media that is generated by users as well as the core media content and is flexing the response based on the conversations (coming in from the user based on preferences, game play, history, virtual and physical engagement). The "conversation" with the system allowing for the reactions of both the connected avatar (verbal, visual/content/specific tone, etc.) as the player engages more and more with the system.

and the connected avatar changes as the system (machine) learns preferences and active input simultaneously Story Development in Real Time Real story time upgrades and interactions with users and/or the space uses analytical collection of information, computer learning and intelligent software to create better stories based on real time data generated by users and pre-developed content. This platform can learn about the emotional and physical input of the user including their behavior patterns and generate typical scenarios that the personality type/player/historical data of that user would "like' to depict typical responses, plots, effects, triggers, transitions in the story world. The system builds upon generated responses predetermined in the system as well as machine learned, research enabled and AI agents to move the story in new personalized directions. The connected avatar will also take into consideration cultural and societal norms of the person or the location of the interactive environment.

Emotionally Intelligent Effects and Experiences

It also will have emotional intelligent and story-build techniques that engage the specific personality of the user. For example, if the system learns that the user disengages when in a phobic situation, the connected avatar may increase its empathetic and encouraging characteristics and help the player through the task.

Self Editing Platform

Self-editing platforms allowing for AI and machine learning updating the game and story based on information being collaboratively injected into our system. It could come from both the user and the creator's influence and the response system adjusts accordingly. Example would be a storyworld option (choosing from three characters to have a conversation). Based on the game experience, the player's choices the connected avatar will self-edit its response and the corresponding story adjusts as well. As a further example, the player may have accumulated certain characteristics in the game, such as the ability to throw fireballs. The connected avatar would incorporate this characteristic into its programming and edit its programming to incorporate the added characteristics of the player. The connected avatar has self-edited and created its own newly learned responses.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An interactive game or entertainment attraction comprising:
one or more databases for storing player data or data relating to one or more special items that can be associated with a player within the interactive game or entertainment attraction;
a controller configured to control a smart environment of the interactive game or entertainment attraction and generate an avatar that is connected to the player, the connected avatar being separate from the player, and used by the player in a virtual environment of the interactive game or entertainment attraction;
one or more devices in the smart environment that collect the player data by monitoring at least one of player activity and one or more player inputs;
a processor configured to:
provide separate gameplay involving the player activity in the smart environment and activity of the connected avatar in the virtual environment;
receive data including the collected player data and at least information acquired by the system from other sources connected to the system;
execute computer readable instructions for performing machine learning operations using at least the received data; and
generate, in real-time, a customized interactive response to the received data based on a result of the machine learning operations, the customized interactive response includes one or more tasks performed by the connected avatar, the one or more tasks including at least one mission performed by the connected avatar exclusively in the virtual environment, the at least one mission being performed separately from the gameplay of the player in the smart environment, and an achievement in the at least one mission in the virtual environment affects the gameplay and achievement of the player in the smart environment; and
one or more display mechanisms for displaying at least the virtual environment and the customized interactive response generated by the processor through the connected avatar.

2. The system of claim 1 wherein the one or more tasks included in the customized interactive response are performed by the connected avatar in the virtual environment of the interactive game, and wherein the customized interactive response generated by the processor involves the connected avatar talking, listening to, or educating the player or providing information, guidance, directions, challenges, assistance, rewards, reminders, special items, or games to the player.

3. The system of claim 1 wherein the one or more devices can be configured to collect the player data by at least one of: manually, captured by photography or digital scanning, uploaded from social media, or by biometric readings; and store the collected player information in the one or more databases.

4. The system of claim 1 wherein the processor is further configured to execute computer readable instructions which causes the connected avatar to mimic a form of the player, or take a form of one of a selected human or humanoid character, mammal, dragon, bird, insect, dinosaur, monster, fantasy creature, object, fire, or environmental characterization.

5. The system of claim 4 wherein the processor is further configured to execute computer readable instructions which causes the connected avatar to have a customized appearance, characteristics, or personalities in the virtual environment.

6. The system of claim 1 wherein the smart environment includes one or more special items associated with the player, the one or more special items comprise a sword, robe, belt, boots, armor, clothing, costume, backpack, helmet, shield, wristband, bracelet, pin, glasses, hat, wand, staff, weapon, book, tool, wings, jewels, or other accessories that can be worn or carried by the player, registered in a database, and recognizable by sensors included in the one or more devices.

7. The system of claim 6 wherein the system recognizes the one or more special items and attributes special skills or enhanced abilities or powers to the player based on the recognized one or more special items.

8. The system of claim 7 wherein the processor is further configured to execute computer readable instructions to generate the customized interactive response of the connected avatar based on the special skills or enhanced abilities or powers attributed to the player, and enhance or affect the progress of the player through a storyline or the interactive game within the virtual environment.

9. The system of claim 1 wherein the one or more devices comprises a camera, RFID scanner, facial recognition scanning device, or biometric scanning device.

10. The system of claim 1 wherein the processor is further configured to execute computer readable instructions to generate the customized interactive response which includes the connected avatar having an interactive and custom conversation with the player.

11. The system of claim 1 wherein the processor is further configured to execute computer readable instructions to generate the customized interactive response which includes the connected avatar being summoned to appear at a desired display mechanism in the smart environment in response to the collected player data or at a predetermined time.

12. The system of claim 1, comprising:
an interface for communicating with a computer or smart device that is external to the interactive game or entertainment attraction, the interface configured to receive the one or more player inputs via a computer or smart device for purposes of continued interactivity, game play, or editing in association with the connected avatar.

13. The system of claim 6, configured to allow the player to purchase the one or more special items.

14. The system of claim 13, wherein the one or more special items are physically possessed by the player in the smart environment.

15. The system of claim 1, wherein the processor is further configured to execute computer readable instructions to generate the customized interactive response, the customized interactive response including updating, in real-time, a storyline of the interactive game or entertainment attraction in the virtual environment.

16. The system of claim 15, wherein to update the storyline, the processor is configured to execute computer readable instructions for machine learning and use the collected player data to learn emotional and physical characteristics of the player, and generate scenarios in the virtual environment based on the learned emotional and physical characteristics of the player.

17. The system of claim 16, wherein the scenarios generated by the processor include plots, effects, triggers, and transitions in the virtual environment.

18. The system of claim 16, wherein to generate the customized interactive response, the processor is configured to execute computer readable instructions for machine learning which causes the processor to use at least the information acquired by the system from other sources to learn at least one of cultural and societal norms associated with the player or information related to a location of the smart environment.

19. A method for providing a connected avatar in an interactive game or entertainment attraction system, comprising:
storing, in one or more databases of the system, player data or data relating to one or more special items that can be associated with a player within the interactive game or entertainment attraction;
controlling, by a controller of the system, a smart environment of the interactive game or entertainment attraction;
generating, by the controller of the system, an avatar that is connected to the player, the connected avatar being autonomous, separate from the player, and used by the player in a virtual environment of the interactive game or entertainment attraction;
collecting, by one or more devices of the system, the player data by monitoring at least one of player activity and one or more player inputs in the smart environment;
receiving, by a processor of the system, data including the collected player data and at least information acquired by the system from other sources connected to the system;
executing, by the processor of the system, computer readable instructions for performing machine learning operations using at least the received data;
providing, by the processor of the system, separate gameplay involving the player activity in the smart environment and activity of the connected avatar in the virtual environment;
generating, in real-time by the processor of the system, a customized interactive response to the received data through the connected avatar based on a result of the machine learning operations, the customized interactive response includes one or more tasks performed autonomously by the connected avatar, the one or more tasks including at least one mission performed by the connected avatar exclusively in the virtual environment, the at least one mission being performed separately from the gameplay of the player in the smart environment, and an achievement in the at least one mission in the virtual environment affects the gameplay and an achievement of the player activity in the smart environment; and
displaying, by one or more display mechanisms of the system, at least the virtual environment and the customized interactive response generated by the processor through the connected avatar.

* * * * *